(12) United States Patent
Turchi et al.

(10) Patent No.: US 7,782,033 B2
(45) Date of Patent: Aug. 24, 2010

(54) METHOD FOR REGULATING A VOLTAGE AND CIRCUIT THEREFOR

(75) Inventors: Joel Turchi, Gagnac sur Garonne (FR); Christophe Basso, Pibrac (FR)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 0 days.

(21) Appl. No.: 11/572,460

(22) PCT Filed: Mar. 2, 2006

(86) PCT No.: PCT/US2006/007449

§ 371 (c)(1),
(2), (4) Date: Jan. 22, 2007

(87) PCT Pub. No.: WO2007/100327

PCT Pub. Date: Apr. 7, 2007

(65) Prior Publication Data

US 2009/0189573 A1    Jul. 30, 2009

(51) Int. Cl.
*G05F 1/569* (2006.01)
(52) U.S. Cl. .................................... 323/276
(58) Field of Classification Search .............. 323/222, 323/234, 273, 276, 282, 283, 351
See application file for complete search history.

(56) References Cited

U.S. PATENT DOCUMENTS

| 4,928,200 A | * | 5/1990 | Redl et al. | 361/94 |
| 5,617,013 A | * | 4/1997 | Cozzi | 323/222 |

* cited by examiner

*Primary Examiner*—Adolf Berhane
(74) *Attorney, Agent, or Firm*—Rennie William Dover

(57) ABSTRACT

A voltage regulator having an overload protection circuit and a method for protecting against an output voltage being less than a predetermined level. The voltage regulator has an overload protection circuit coupled between a feedback network and a regulation section. A power factor correction circuit is connected to the regulation section. An output voltage from the power factor correction circuit is fed back to the feedback network, which transmits a portion of the output voltage to the overload protection circuit. If the output voltage is less than the predetermined voltage level, a transconductance amplifier generates a current that sets an overload flag. Setting the overload flag initiates a delay timer. If the delay exceeds a predetermined amount of time, the overload protection circuit shuts down the voltage regulator.

18 Claims, 2 Drawing Sheets

METHOD FOR REGULATING A VOLTAGE AND CIRCUIT THEREFOR

FIELD OF THE INVENTION

This invention relates, in general, to power supplies and, more particularly, to power factor correction systems.

BACKGROUND OF THE INVENTION

Power Factor Correction ("PFC") systems are typically used within power supply applications requiring ac/dc rectification. Rectifying arrangements for use in such an application may comprise a full wave voltage rectifier, typically in the form of a diode bridge, and a main Switch Mode Power Supply ("SMPS") to provide regulation of the output waveform. PFC circuits are inserted between the line and the main SMPS to draw a sinusoidal current from the line and to provide Direct Current ("DC") voltage to the main SMPS. For many systems to operate properly, it is desirable for the output voltage of the PFC circuit to be within a specified range. PFC circuits deliver a squared sinusoidal power that matches an average power demand of the load. Thus, when the power fed to the load is lower than the demand, the output capacitor compensates for the lack of energy by discharging and when the power fed to the load is greater than the demand, the capacitor stores the excess energy. As a consequence, a ripple appears in the output voltage that designers compensate for by integrating the output voltage. A drawback with the integration is that it degrades the dynamic performance of the PFC systems and makes them slow. For example, an abrupt decrease in the load results in high output voltage overshoot and an abrupt increase in the load results in a high output voltage undershoot.

Hence, there exists a need for a regulator circuit having an overload protection circuit and a method of improving the dynamic performance and speed of the regulator circuit. In addition, it is desirable for the regulator circuit to be cost and time efficient to manufacture.

BRIEF DESCRIPTION OF THE DRAWINGS

The present invention will be better understood from a reading of the following detailed description, taken in conjunction with the accompanying drawing figures, in which like reference characters designate like elements, and in which.

DETAILED DESCRIPTION

Figure 1:
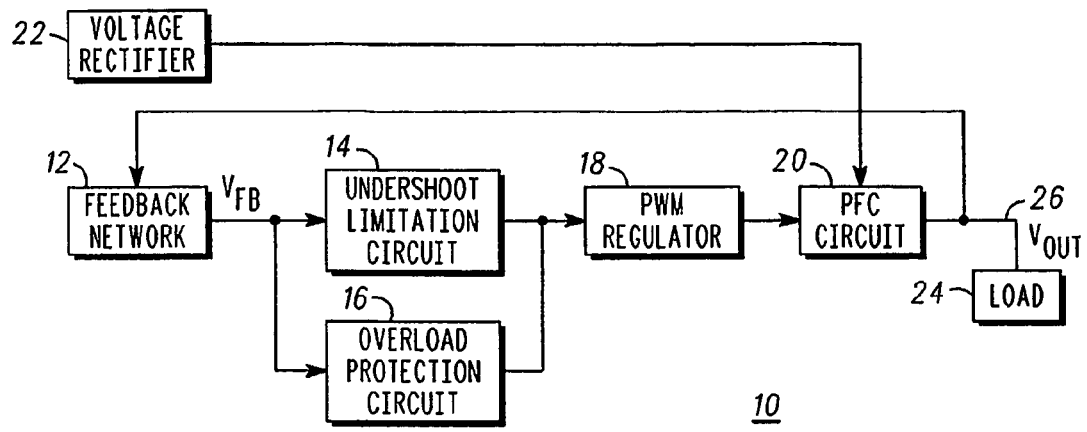
FIG. 1 is a block diagram of a voltage regulator having an undershoot protection circuit and an overload protection circuit in accordance with an embodiment of the present invention.

FIG. 1 is a block diagram of a voltage regulator 10 comprising a feedback network 12, an undershoot limitation circuit 14, an overload protection circuit 16, a switching or Pulse Width Modulated ("PWM") regulation portion 18, a Power Factor Correction ("PFC") circuit 20, and a voltage rectifier 22. More particularly, an input of undershoot limitation circuit 14 is connected to an output of feedback network 12 and an output of undershoot limitation circuit 14 is connected to an input of regulation portion 18. The output of feedback network 12 is also connected to the input of overload protection circuit 16 and the output of overload protection circuit 16 is connected to the input of regulation portion 18. The output of regulation portion 18 is connected to PFC circuit 20 and the output of PFC circuit 20 is connected to an input to feedback network 12 and to a load 24. Regulation portions and PFC circuits such as portion 18 and circuit 20, respectively, are known to those skilled in the art.

In operation, voltage rectifier 22 provides a rectified signal to PFC circuit 20, which boosts the rectified voltage signal and generates an output voltage $V_{OUT}$ at output 26. Output voltage $V_{OUT}$ is fed back to feedback network 12 which generates a feedback signal $V_{FB}$ at its output. If feedback voltage $V_{FB}$ is less than a predetermined level, undershoot limitation circuit 14 transmits a boosted control voltage to regulation portion 18, which regulates the control voltage and transmits it to PFC circuit 20. In case of an overload condition, the detection of which is discussed hereinafter, then overload protection circuit 16 grounds the output signal of voltage regulator 10. In accordance with one embodiment, overload protection circuit 16 includes a delay element so that it is not triggered by transient voltages appearing in output voltage $V_{OUT}$.

Figure 2:
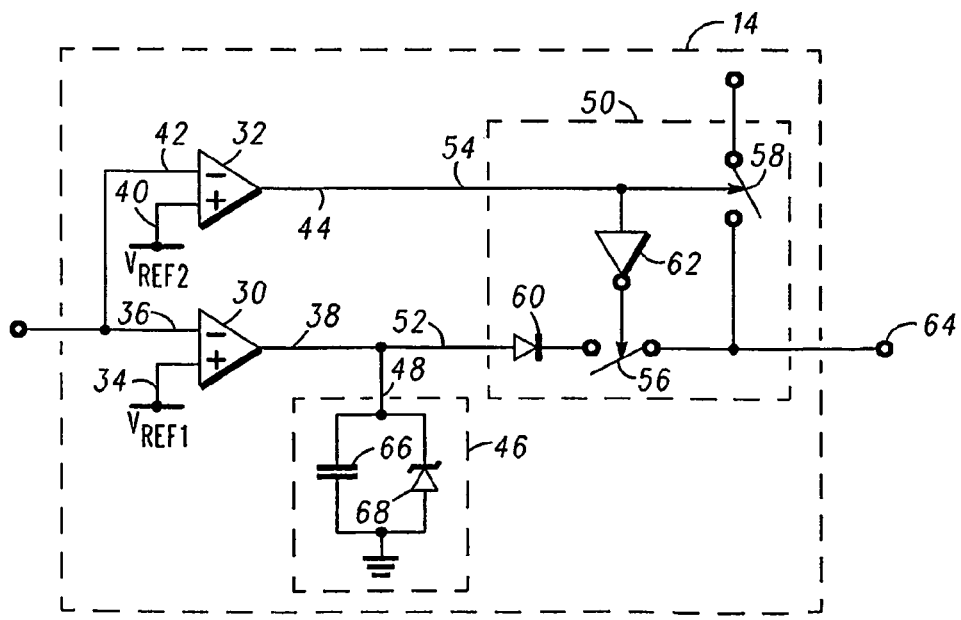
FIG. 2 is a schematic diagram of the undershoot protection circuit of FIG. 1.

Referring now to FIG. 2, a schematic diagram of undershoot limitation circuit 14 is illustrated. What is shown in FIG. 2 is a transconductance amplifier 30 and a comparator 32. Transconductance amplifier 30 has inputs 34 and 36 and an output 38, and comparator 32 has inputs 40 and 42 and an output 44. Inputs 36 and 42 are connected to each other and inputs 34 and 40 are coupled for receiving reference voltages $V_{REF1}$ and $V_{REF2}$, respectively. Commonly connected inputs 36 and 42 are connected to feedback network 12 (shown in FIG. 1). Output 38 of transconductance amplifier 30 is connected to an output 48 of a compensation network 46 and to an input 52 of a switching circuit 50. In accordance with one embodiment, switching circuit 50 comprises switches 56 and 58, a diode 60, and an inverter 62. Switch 56 has a terminal coupled to input 52 through diode 60 and a terminal connected to an output 64 and to one terminal of switch 58. The terminal of switch 56 that is coupled to input 52 is also coupled to output 48 of compensation network 46 through diode 60. Input 54 is operatively coupled for controlling switch 58 and for controlling switch 56 through inverter 62. In other words, a control signal is transmitted through input 54 to control the operating states of switches 56 and 58, i.e., to control whether switches 56 and 58 are open or closed. Output 64 of switching circuit 50 is connected to the input of regulation circuit 18 shown in FIG. 2.

By way of example, compensation network 46 is comprised of a capacitor 66 coupled in a parallel configuration with a Zener diode 68.

Feedback network 12 may be comprised of a voltage divider network comprising a pair of resistors configured so that one terminal of each resistor is connected together and to the commonly connected inputs 36 and 42. It should be understood that feedback network 12 is not limited to being a voltage divider network. Although feedback network 12 may be integrated in a semiconductor substrate along with undershoot limitation network 14, PWM regulator 42, and start-up circuit 162, it is preferably provided as an off-chip circuit network.

Figure 3:
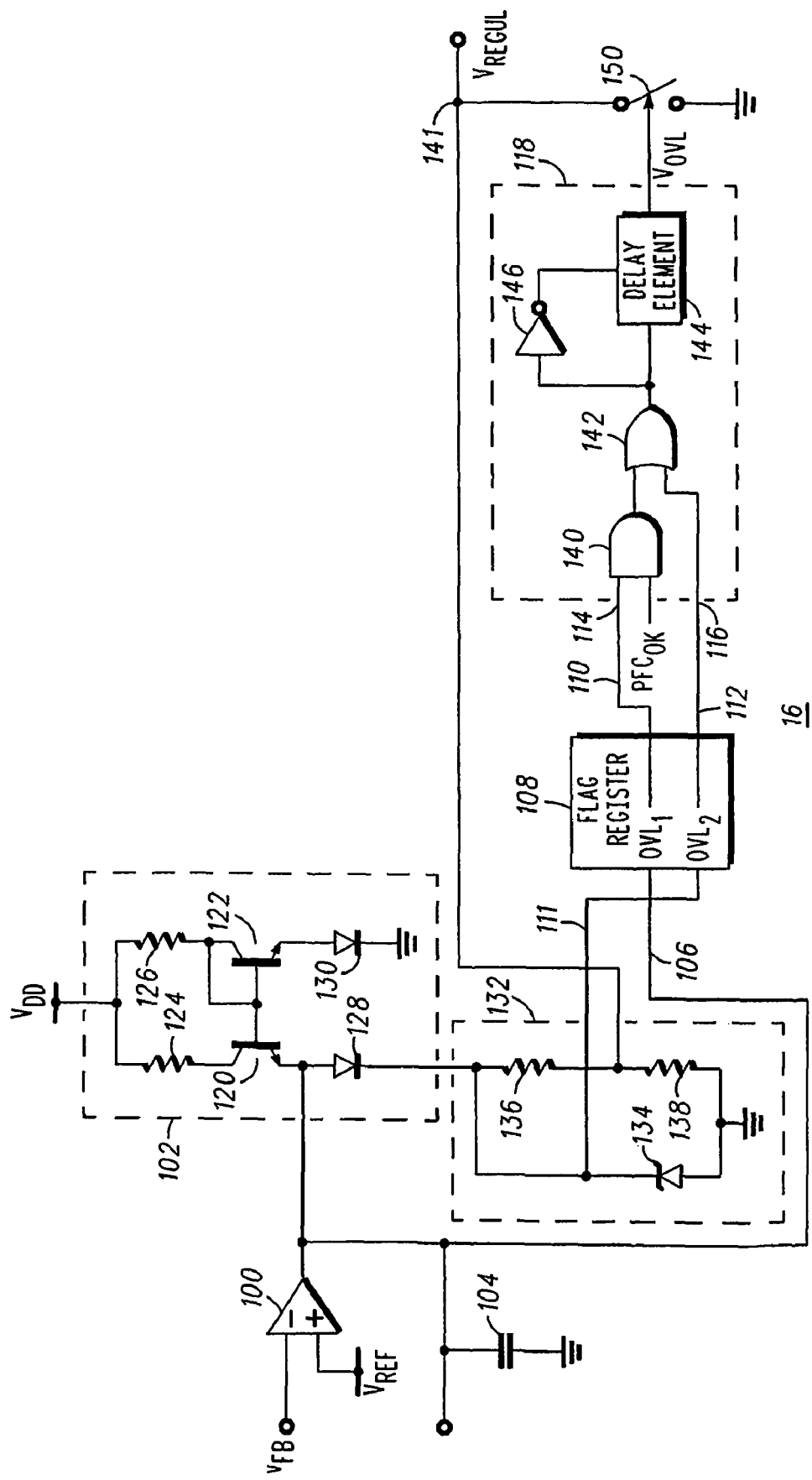
FIG. 3 is a schematic diagram of the overload protection circuit of FIG. 1.

Referring now to FIG. 3, a schematic diagram of overload protection circuit 16 is shown. Overload protection portion 16 provides protection against an excessive power demand appearing on an output of a regulator circuit, e.g., output 26 of regulator circuit 10. What is shown in FIG. 3 is a transconductance amplifier 100 having an input coupled for receiving a feedback signal $V_{FB}$, an input coupled for receiving a reference voltage $V_{REF}$, and an output coupled to a current mirror 102, to a capacitor 104 that is connected to ground, and to an input 106 of a flag register 108. A clamping circuit 132 has an input connected to current mirror 102 and an output connected to an input 111 of flag register 108. Outputs 110 and 112 of flag register 108 are connected to inputs 114 and 116 of a delay circuit 118, respectively.

In accordance with one embodiment, current mirror 102 comprises a pair of bipolar junction transistors 120 and 122 having commonly connected bases. The collectors of bipolar junction transistors 120 and 122 are coupled for receiving a source of operating potential $V_{DD}$ through resistors 124 and 126, respectively. The base of bipolar junction transistor 122 is connected to its collector. The emitter of bipolar junction transistor 122 is coupled to a source of operating potential such as, for example, ground through a diode 130 and the emitter of bipolar junction transistor 120 is coupled to the input of clamping circuit 132 through diode 128. Although transistors 120 and 122 are shown and described as being bipolar junction transistors, they can also be field effect transistors.

Clamping circuit 132 comprises a Zener diode 134 coupled in parallel across a pair of resistors 136 and 138. More particularly, the cathode of Zener diode 134 and one terminal of resistor 136 are connected to the cathode of diode 128 and the anode of Zener diode 134 and one terminal of resistor 138 are coupled for receiving a source of operating potential such as, for example, ground. The other terminals of resistors 136 and 138 are connected together and to a regulation portion such as regulation portion 18 (shown in FIG. 1) at output 141.

Delay circuit 118 comprises a two-input AND gate 140 having an input that serves as input 114 of delay circuit 118 and an input coupled for receiving a control signal $PFC_{OK}$. An output of two-input AND gate 140 is connected to an input of a 2-input OR gate 142. The other input of 2-input OR gate 142 serves as input 116 of delay circuit 118. An output of 2-input OR gate 142 is connected to an input of a delay element 144. The output of 2-input OR gate 142 is coupled for resetting delay element 144 through an inverter 146. An output of delay circuit 118 serves as a control input for a switch 150, which has a terminal connected to output 141 and a terminal coupled for receiving a source of operating potential such as, for example, ground.

In operation, when the load demand exceeds the maximum power that PFC circuit 20 (shown in FIG. 1) can provide (i.e., when an overload condition exists), the output signal of the PFC stage decreases. In response to this decrease, feedback signal $V_{FB}$ also decreases causing transconductance amplifier 100 to charge capacitor 104 in order to increase the power delivery. In this condition, PFC circuit 20 cannot maintain the bulk voltage at its nominal level, hence transconductance amplifier 100 continues to charge capacitor 104. In response to the overload condition, transconductance amplifier 100 generates a current substantially equal to its maximum current, which causes a flag in flag register 108 to be asserted that transmits a logic high voltage level from output 110 of flag register 108 to input 114 of delay circuit 118. The logic high voltage level serves as a control signal. If the voltage regulator is no longer in the start-up phase, a control signal $PFC_{OK}$ is at a logic high voltage level, which logic high voltage level is transmitted to the second input of 2-input AND gate 140. In response to the logic high voltage signals at its inputs, AND gate 140 transmits a logic high voltage level to 2-input OR gate 142, which generates a control signal for turning on delay element 144, which delay element delays the transmission of an overload signal $V_{OVL}$ for a predetermined amount of time. By way of example, the delay is 100 milliseconds (msec). In other words, the control signal at input 114 indicates that an overload condition exists and control signal $PFC_{OK}$ indicates that the overload condition is not occurring during start-up. Thus, control signal $PFC_{OK}$ serves as an indicator signal. If the overload condition continues for more than the predetermined time, overload signal $V_{OVL}$ disables the voltage regulator.

Alternatively, when an overload occurs at the output of the voltage regulator, transconductance amplifier 100 injects a current through clamping circuit 132 which increases the voltage across Zener diode 134 to a high enough level to clamp the voltage. The voltage across Zener diode 134, when activated, sets a flag of flag register 108. Flag register 108 then transmits a logic high voltage level to input 116 of delay circuit 118, i.e., it transmits a logical high voltage to an input of 2-input OR gate 142. Like the condition in which a logic high voltage levels appear at the inputs of 2-input AND gate 140, the logic high voltage level at the input of 2-input OR gate 142 generates a control signal for turning on delay element 144, which delay element delays the transmission of an overload signal $V_{OVL}$ for a predetermined amount of time. Delay element 144 is also referred to as a timer. In this case, the output voltage of the regulator is at its maximum level, thus delay element 144 is activated even if the regulator circuit is in the start-up phase. An advantage of including clamping circuit 132 is that it allows detecting conditions in which PFC circuit 20 does not start-up. Including the delay circuit allows distinguishing an overload condition from other transient conditions that may occur. These events are not considered overload conditions and the timer immediately resets as soon as control signal $V_{OVL}$ falls to a logic low voltage level.

By now it should be appreciated that a regulator having undershoot and overload protection and method for regulating output voltage have been provided. In accordance with an embodiment of the present invention, the overload protection circuit includes a delay element to verify that the overload condition is not a transient condition, thereby decreasing the risk of short transient events triggering the overload protection circuit.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method for regulating a voltage, comprising:
    generating a first control signal when a circuit is operating in a mode other than a start up operating mode;
    generating a second control signal when a load demand exceeds a predetermined value;
    initiating a timer in accordance with the second control signal, wherein initiating the timer includes generating a third control signal from the second control signal;
    generating an updated third control signal and transmitting the updated third control signal to a second control circuit after a predetermined delay; and
    disabling the circuit if the timer exceeds a predetermined amount of time.

2. The method of claim 1, wherein generating the second control signal comprises:
    providing a first reference signal;

comparing a feedback signal with the first reference signal; and generating the second control signal in response to the comparison between the feedback signal and the first reference signal.

3. The method of claim 1, wherein the predetermined delay is approximately one hundred milliseconds.

4. The method of claim 1, further including using the second control circuit to disable the circuit in response to the updated third control signal.

5. A method for regulating an output voltage, comprising:
operating in a first mode when the output voltage has an undershoot component; and
operating in a second mode when the output voltage has an overload component, wherein operating in the first mode includes:
transmitting a boosted control voltage to a regulation circuit; and wherein operating in the second mode includes:
generating a first control signal when a circuit is operating in a non start-up mode;
generating a second control signal when a load demand exceeds a predetermined value;
initiating a timer in accordance with the second control signal, wherein initiating the timer includes generating a third control signal from the second control signal;
generating an updated third control signal and transmitting the updated third control signal to a second control circuit; and
disabling the circuit lithe timer exceeds a predetermined amount of time.

6. The method of claim 5, wherein disabling the circuit includes grounding the output of the circuit.

7. The method of claim 5, wherein generating the second control signal includes generating the second control signal in response to a feedback signal and a first reference signal.

8. The method of claim 5, wherein generating the updated third control signal includes delaying the third control signal for a predetermined delay.

9. A regulator circuit, comprising:
a transconductance amplifier having first and second inputs and an output, the first input coupled for receiving a feedback voltage and the second input coupled for receiving a first reference voltage;
a voltage clamping circuit having an input and an output, the input coupled to the transconductance amplifier; and
a delay circuit that provides a fixed delay coupled to the voltage clamping circuit.

10. The regulator circuit of claim 9, wherein the voltage clamping circuit comprises a Zener diode.

11. The regulator circuit of claim 10, wherein the voltage clamping circuit further comprises first and second resistors, wherein the first resistor is coupled to the second resistor, and wherein the Zener diode is in parallel with the combination of the first and second resistors.

12. The regulator circuit of claim 11, further including a current mirror having an input and an output, wherein the current mirror couples the transconductance amplifier to the voltage clamping circuit, and wherein the input is coupled to the transconductance amplifier and the output is coupled to the voltage clamping circuit.

13. The regulator circuit of claim 12, further including a diode coupled between the output of the current mirror and the parallel combination of the Zener diode and the combination of the first and second resistors.

14. The regulator circuit of claim 9, wherein the delay circuit comprises a delay element having an input and an output, the input coupled to the output of the voltage clamping circuit.

15. The regulator circuit of claim 9, wherein the delay circuit further comprises:
a first logic gate having first and second inputs and an output, the first input coupled for receiving the first control signal and the second input coupled for receiving an indicator signal;
a second logic gate having first and second inputs and an output, the first input of the second logic gate coupled to the output of the first logic gate, the second input of the second logic gate coupled for receiving the second control signal, and the output of the second logic gate coupled to the input of the delay element.

16. The regulator circuit of claim 15, wherein the first logic gate is an AND gate and the second logic gate is an OR gate.

17. The regulator circuit of claim 9, further including a switch having a terminal coupled to the clamping circuit, a terminal coupled for receiving a source of operating potential, and a control terminal coupled to the delay circuit.

18. The method of claim 9, further including a capacitor coupled between the output of the transconductance amplifier and a source of operating potential.

* * * * *